US012248706B2

United States Patent
Sela et al.

(10) Patent No.: US 12,248,706 B2
(45) Date of Patent: Mar. 11, 2025

(54) DATA STORAGE DEVICE AND METHOD FOR REDUCING FLUSH LATENCY

(71) Applicant: Western Digital Technologies, Inc., San Jose, CA (US)

(72) Inventors: Rotem Sela, Haifa (IL); Meytal Soffer, Maale' Hagalil (IL); Asher Druck, Balfor (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/220,933

(22) Filed: Jul. 12, 2023

(65) Prior Publication Data

US 2024/0143227 A1     May 2, 2024

Related U.S. Application Data

(60) Provisional application No. 63/419,418, filed on Oct. 26, 2022.

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0659; G06F 3/0604; G06F 3/0673; G06F 2212/7203; G06F 3/061; G06F 3/0656; G06F 12/0246; G06F 3/0679
See application file for complete search history.

(56) References Cited

U.S. PATENT DOCUMENTS

| | | | |
|---|---|---|---|
| 9,632,711 B1* | 4/2017 | Obr | G06F 3/0619 |
| 10,810,123 B1* | 10/2020 | Xu | G06F 12/0804 |
| 2015/0106410 A1 | 4/2015 | Zaltsman et al. | |
| 2015/0178013 A1* | 6/2015 | Rostoker | G06F 3/0644 |
| | | | 711/115 |
| 2015/0317095 A1 | 11/2015 | Voigt | |
| 2015/0356012 A1 | 12/2015 | Voigt | |
| 2016/0077968 A1 | 3/2016 | Sela et al. | |
| 2016/0292075 A1 | 10/2016 | Mohan | |
| 2017/0017424 A1* | 1/2017 | Matthews | G06F 3/067 |
| 2017/0344470 A1* | 11/2017 | Yang | G06F 12/0246 |
| 2018/0059966 A1* | 3/2018 | Lee | G06F 13/28 |
| 2018/0329651 A1* | 11/2018 | Chang | G06F 3/0656 |
| 2019/0354478 A1* | 11/2019 | Kashyap | G06F 11/1072 |
| 2020/0348864 A1* | 11/2020 | Tylik | G06F 3/0673 |
| 2022/0350531 A1* | 11/2022 | Wang | G06F 3/0659 |

(Continued)

FOREIGN PATENT DOCUMENTS

CN     110515861 A   *  5/2018   .........  G06F 12/0877

*Primary Examiner* — Shawn X Gu
*Assistant Examiner* — Mohammad S Hasan
(74) *Attorney, Agent, or Firm* — Crowell & Moring LLP

(57) ABSTRACT

A data storage device has a cache and a non-volatile memory. Instead of flushing the entire cache to the non-volatile memory in response to a command from a host, the data storage device flushes only the cached data that is associated with an identifier provided by the host. This allows the cached data associated with the identifier to be flushed more quickly. The data storage device can also prioritize queued commands that are associated with the identifier.

20 Claims, 7 Drawing Sheets

(56) References Cited

U.S. PATENT DOCUMENTS

| | | | |
|---|---|---|---|
| 2023/0205691 A1* | 6/2023 | Pan | G06F 12/126 |
| | | | 711/135 |
| 2023/0266898 A1* | 8/2023 | Bert | G06F 3/0683 |
| | | | 711/154 |
| 2023/0289079 A1* | 9/2023 | Hs | G06F 3/0619 |
| 2023/0342028 A1* | 10/2023 | Lee | G06F 3/0604 |

* cited by examiner

DATA STORAGE DEVICE AND METHOD FOR REDUCING FLUSH LATENCY

CROSS-REFERENCE TO RELATED APPLICATION

This application claims priority to U.S. provisional patent application No. 63/419,418, filed Oct. 26, 2022, which is hereby incorporated by reference.

BACKGROUND

A data storage device can contain a non-volatile memory and a cache, which can be part of the non-volatile memory (e.g., in single-level cell (SLC) blocks)) or can be part of volatile memory (e.g., SRAM) in the data storage device. Data received from a host can be initially stored in the cache and later flushed to longer-term storage in the non-volatile memory.

DETAILED DESCRIPTION

The following embodiments generally relate to a data storage device and method for reducing flush latency. In one embodiment, a data storage device is provided comprising a non-volatile memory and a controller. The controller is configured to receive, from a host, data associated with different identifiers; store the data in a cache; receive, from the host, a flush command comprising a first identifier; and in response to receiving the flush command comprising the first identifier, flush, from the cache to the non-volatile memory, only data that is associated with the first identifier.

In another embodiment, a method is provided that is performed in a data storage device comprising a non-volatile memory. The method comprises: caching data received from a host; receiving, from the host, a synch cache command comprising an identifier; identifying which of the cached data is associated with the identifier; and copying only the identified data to the non-volatile memory in response to the synch cache command.

In yet another embodiment, a data storage device is provided comprising: a non-volatile memory; a cache; and means for flushing, from the cache to the non-volatile memory, only data in the cache that is associated with an identifier in a flush command received from a host. Other embodiments are provided and can be used alone or in combination.

Figure 1A:
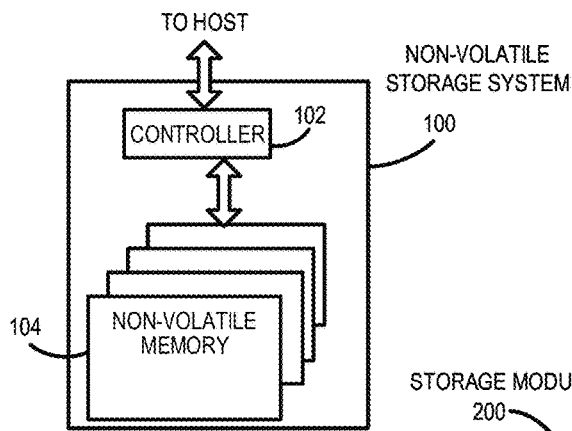
FIG. 1A is a block diagram of a non-volatile storage system of an embodiment.
Figure 1B:
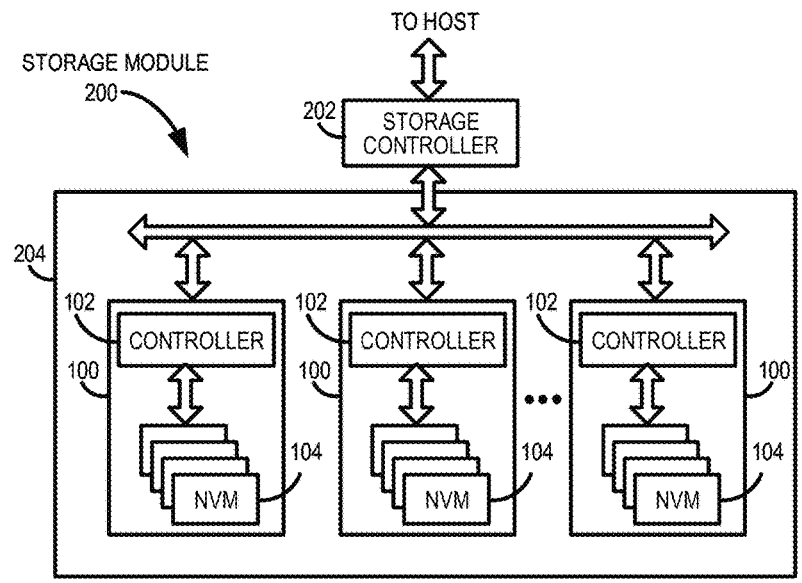
FIG. 1B is a block diagram illustrating a storage module of an embodiment.
Figure 1C:
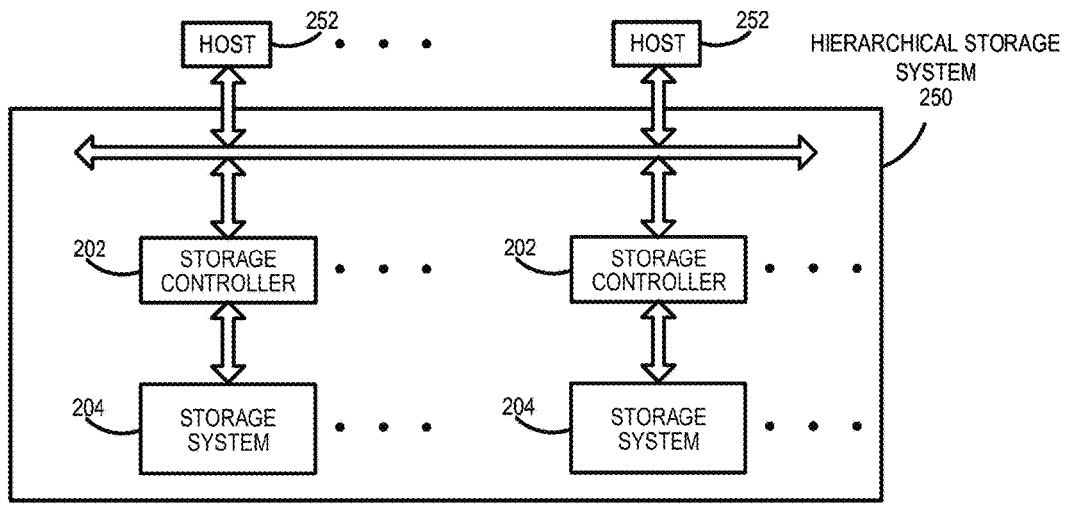
FIG. 1C is a block diagram illustrating a hierarchical storage system of an embodiment.

Turning now to the drawings, storage systems suitable for use in implementing aspects of these embodiments are shown in FIGS. 1A-1C. A storage system is sometimes referred to herein as a data storage device (DSD), which refers to a device that stores data (e.g., hard disk drives (HDDs), solid state drives (SSDs), tape drives, hybrid drives, etc.). FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level (one-bit per cell) cells (SLC) or multiple-level cells (MLC), such as two-level cells, triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a UFS (Universal Flash Storage), a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDEVIM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
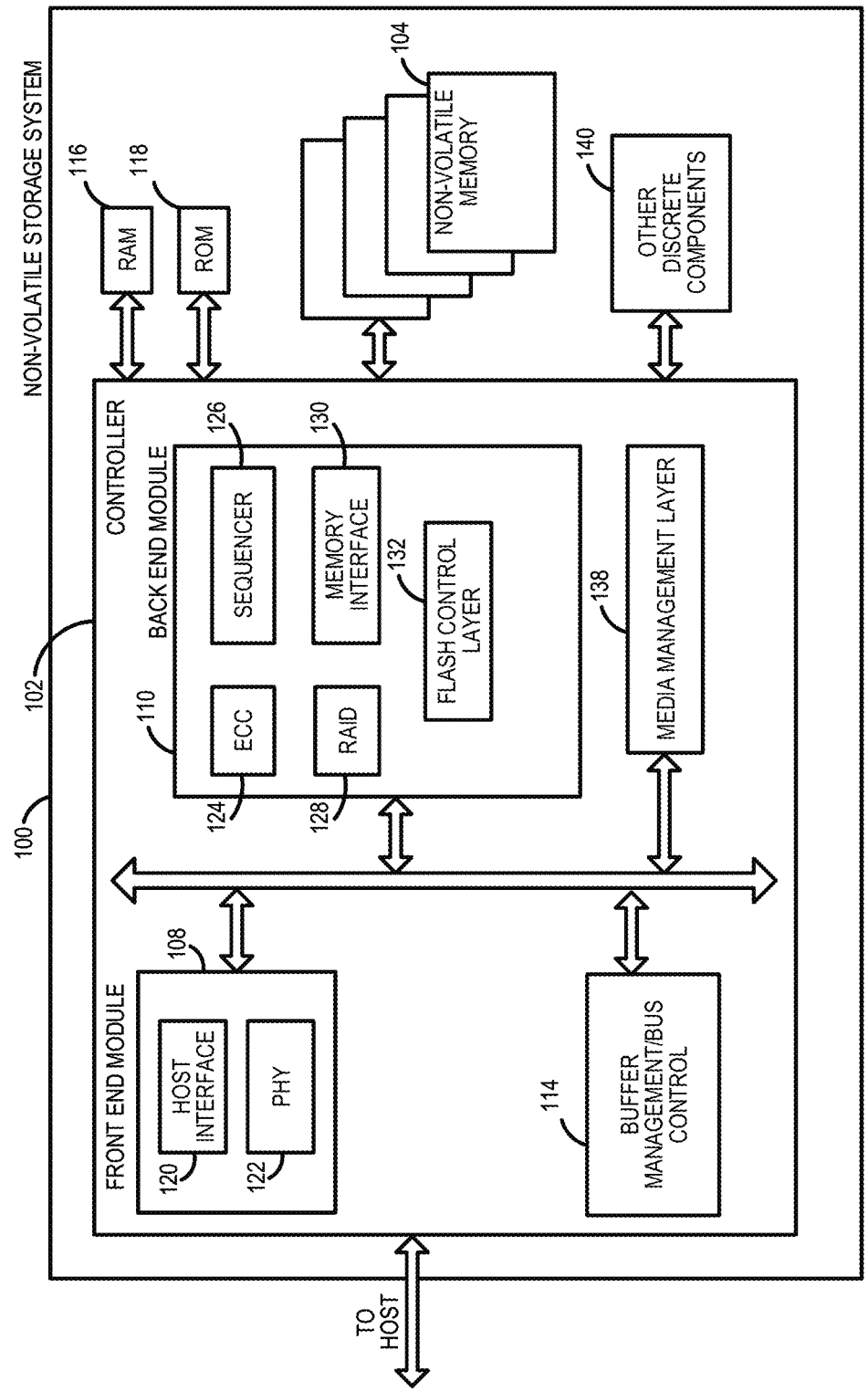
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
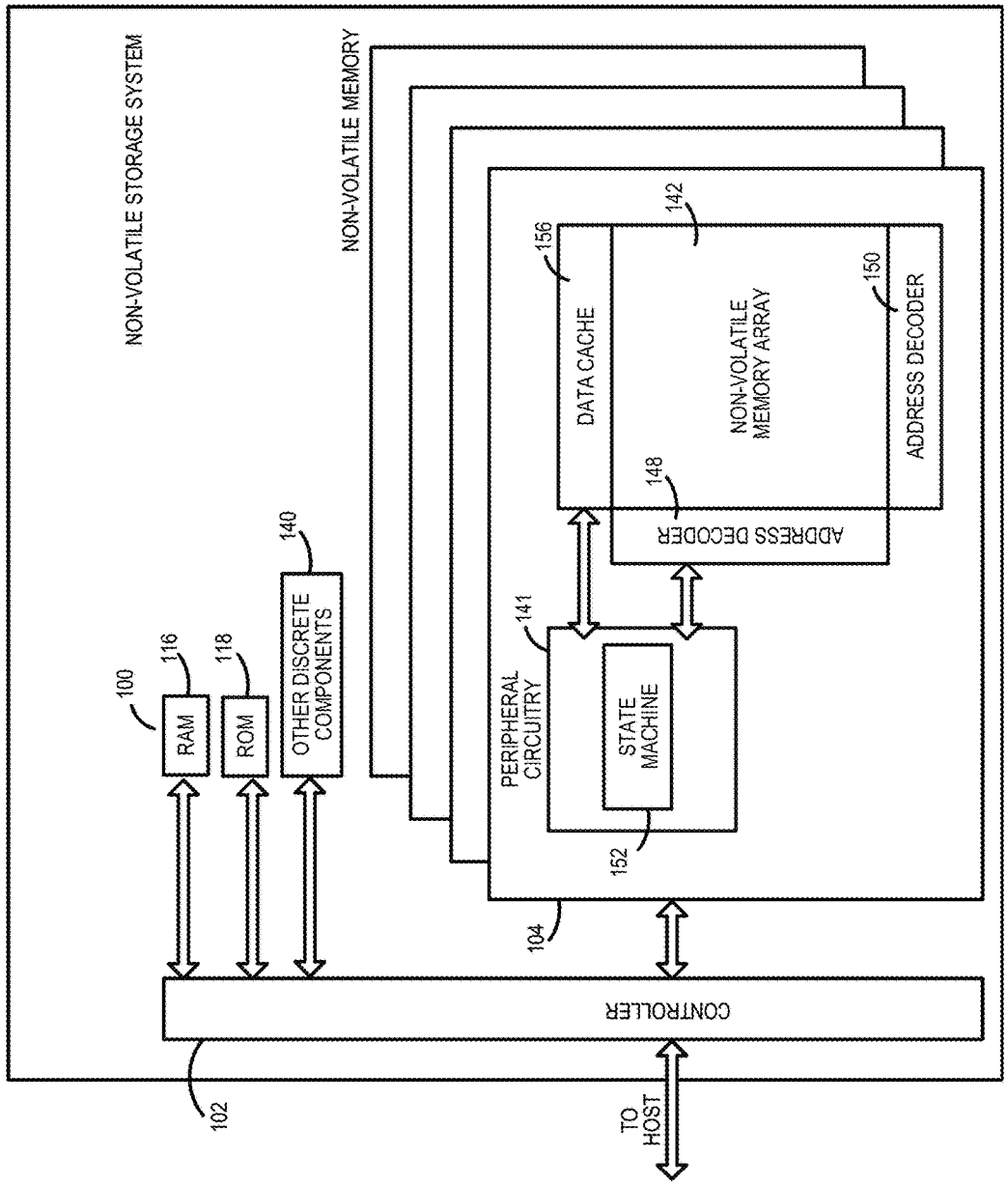
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data.

The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
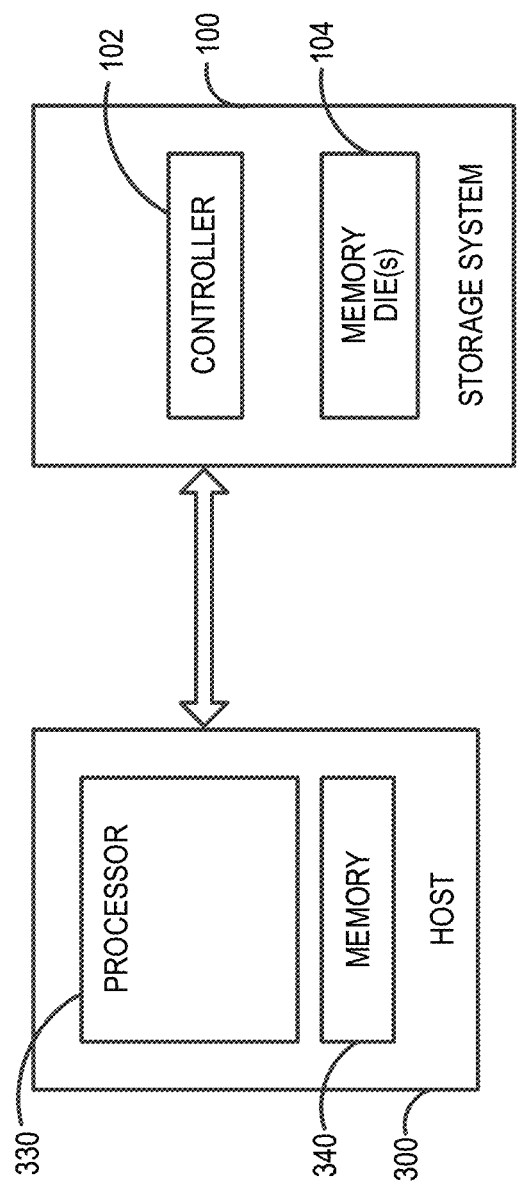
FIG. 3 is a block diagram of a host and data storage device of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

In this embodiment, the data storage device 100 comprises a cache, which can be used to initially store data received from the host 300 before the data is later sent (flushed) to the non-volatile memory 104 for storage. The cache can take any suitable form. For example, the cache can be volatile memory (e.g., RAM 116, which can be static random access memory (SRAM), dynamic random access memory (DRAM), etc.). As another example, the cache can be part of the non-volatile memory 104 (e.g., in single-level cell (SLC) blocks in the non-volatile memory 104). In this situation, "flushing the data to the non-volatile memory" can refer to copying the data stored in the cache portion of the non-volatile memory 104 to the longer-term portion of the non-volatile memory 104 (e.g., moving the data from the SLC blocks to the multi-level cell (MLC) blocks in the non-volatile memory 104). Also, while the cache can be just in volatile memory or just in the non-volatile memory 104, the cache can also be distributed between volatile memory and the non-volatile memory 104.

In some situations, after an application on the host 300 writes a file to the data storage device 100, the application or the host's file system (e.g., the host software layer) sends a flush or cache synchronization command to the data storage device 100 to guarantee that the entire data and metadata relevant for the application is safely stored in the non-volatile memory 104. During the flush process, write operation(s) are performed to write, in the non-volatile memory 104, data that stored in the cache, after which the host 300 is informed that the data has been safely stored. After the data is written in the non-volatile memory 104, the data can be erased from the cache or can be retained in the cache for some period of time. So, the phrases "flushing," "synching," "copying," etc. do not necessarily imply removal or retention of the data in the cache (e.g., "copying" does not necessarily mean that the data is retained in the cache after copying, so "copying" may or may not imply "moving" the data).

Figure 4:
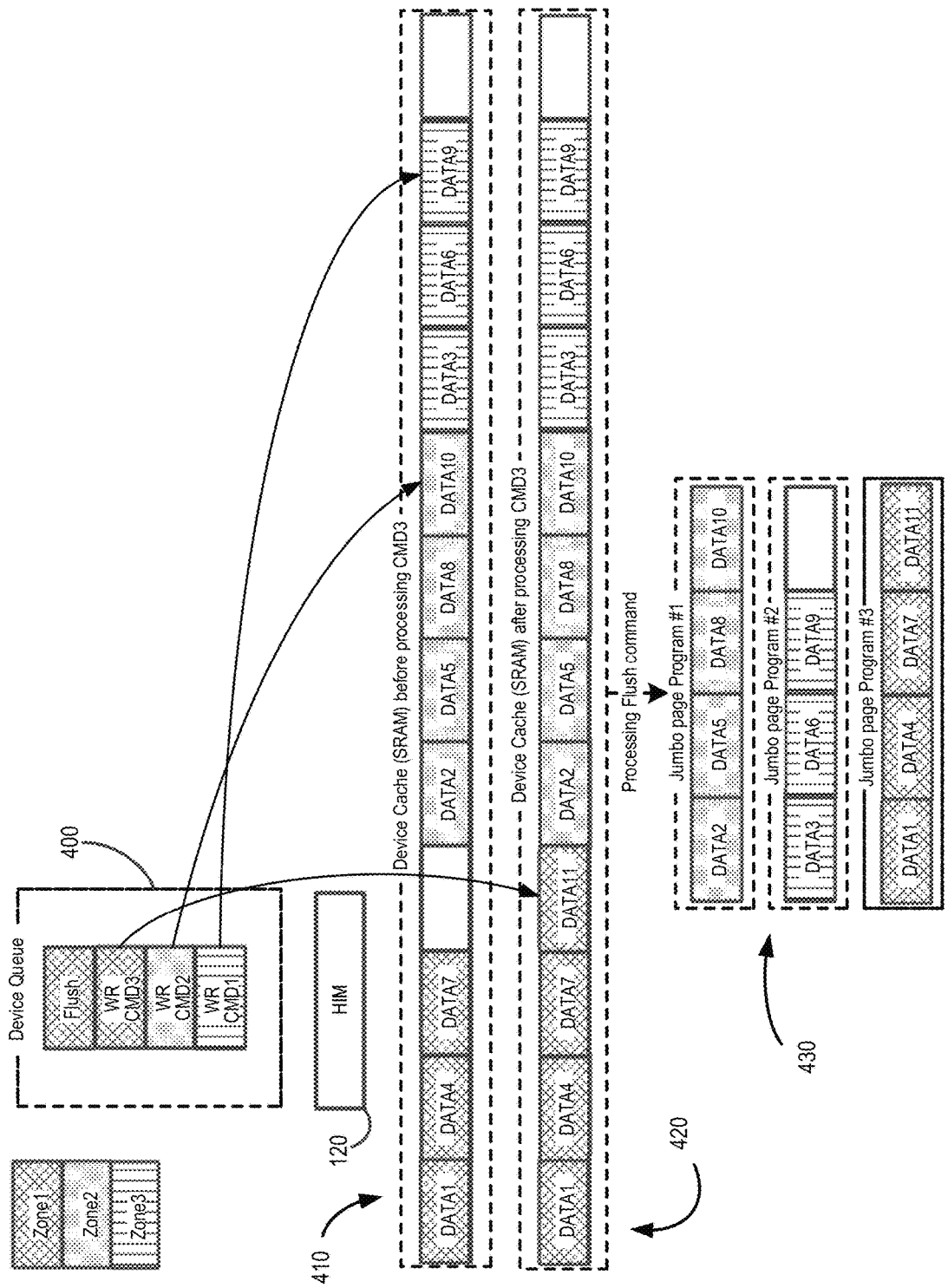
FIG. 4 is a block diagram illustrating a flush operation of an embodiment.

An example of this flushing process will now be described in conjunction with the block diagram of FIG. 4. As shown in FIG. 4, the data storage device 100 in this example comprises a command queue 400 (which can be located in the controller 102 or in another location in the data storage device 100) and a host interface module (HIM) 120, which can be part of or separate from the controller 102 and can sequence commands in the queue 400. In this example, the queue 400 stores write command (WR CMD) 1, WR CMD 2, WR CMD3, and a Flush command.

The non-volatile memory 104 in this example comprises a plurality of "zones." As used herein, a "zone" can refer to a logical block address range in the non-volatile memory 104 that is written sequentially (a write pointer in the data storage device 100 can keep track of the position of the next write), cannot be directly overwritten (i.e., the entire zone must be erased), and is managed by the host 300 (the host 300 aligns its writes to the sequential write requirement of the zone and manages garbage collection). The use of zones can reduce write amplification, overprovisioning, and internal controller memory usage, while improving throughput and latency. In this example, WR CMD 1, WR CMD 2, and WR CMD3 are associated with Zone 3, 2, and 1, respectively (e.g., via an identifier, such as a Group ID, in the write command).

Portion 410 shows the state of the cache (which is implemented in SRAM in this example) after the HIM 120 sends WR CMD 1 and WR CMD 2 to the controller 102 for processing. This results in DATA9 from WR CMD 1 and DATA10 from WR CMD 2 being stored in the cache. As indicated by the various hatchings in the drawings, the data stored in the cache is associated with the various identifiers of the zones to which they relate. These identifiers can be associated with the applications on the host 300 that generated the write commands. More information about these identifiers and how they can be stored is provided below. Portion 420 shows the state of the cache after the HIM 120 sends WR CMD 3 to the controller 102 for processing. This results in DATA11 from WR CMD 3 also being stored in the cache.

In this example, the controller 102 arranges the data in the cache according to identifiers, so that data associated with a given identifier is stored together (e.g., in the same logical block address (LBA) range) in the cache. This can make the flushing of the data to the non-volatile memory 104 more efficient. In this embodiment, the identifiers are associated with the zone in the memory 104 that the data is to be stored. The identifiers can be associated with other information, such as, but not limited to, temperature of the data, application, Group ID, or stream. As used herein, "temperature" refers to the likelihood that data (or a zone) will be accessed, with "hot" designating "likely to be frequently accessed" and "cold" designating "unlikely to be frequently accessed."

After the HIM 120 provides the Flush command to the controller 104, the controller 104 flushes all the data from the cache to the non-volatile memory 104. In this example, the data associated with different identifiers are stored in different "jumbo pages." As used herein, a "jumbo page" refers to a page of memory cells that spans multiple memory dies and planes. A jumbo page can contain, for example, hundreds of megabytes of data. While jumbo pages are used in this example, it should be understood that these embodiments should not be limited to the use of jumbo pages. After all the data from the cache is flushed to the non-volatile memory 104 (in three jumbo page programming operations), the controller 102 can inform the host 300 that the flush command has been executed. Once all three jumbo pages are programmed and all the data from all three Zones is securely stored (e.g., verified), the data storage device 100 can return, to the host 300, a response to the Flush request. The host 300 may be waiting for the data storage device 100 to return this response before moving to its next task.

This sequential process can be time consuming. For example, in this example, before the Flush command is be executed, all the write commands earlier in the queue 400 are executed in the order in which they were received. So, the application that wanted to flush Zone 1 had to wait for commands to be performed on Zones 2 and 3 and then wait for all the data in the queue (from Zones 1, 2, and 3) to be flushed to the non-volatile memory 104. Also, if the cache size is larger than the NAND page size of the non-volatile memory 104, flushing the data can require multiple NAND program operations, especially when multiple dies and/or planes are involved. Additionally, the programming operations of the Flush command are not efficient in this example due to partial jumbo page programming for Zone 2.

To address these issues, instead of flushing all of the data in the cache, the controller 102 can flush only the data associated with the zone/application that needs its data flushed. In one embodiment, the host 300 sends a synchronize cache command with a particular logical block address (LBA) range to accomplish this. However, this may be difficult to manage by the host 300 and may not improve fragmentation.

In another embodiment, when the host 300 provides data to the data storage device 100 for storage, it also provides an identifier associated with the data (e.g., to associate the data with an application, zone, etc.). That way, if a given application wants its data flushed, the host 300 can provide the identifier of that application or zone in the flush command, and the controller 102 of the data storage device can flush only the cached data associated with that identifier. Additionally, the controller 100 can provide priority to commands in the data storage device's command queue that are associated with the identifier in the flush command. That way, the host 300 does not need to wait for the processing of queued commands that are irrelevant to the data that it wants flushed.

This embodiment reduces flush latency for the application that wants its data flushed because the application does not need to wait for all of the data in the cache to be flushed in response to the flush command. Instead, the data storage device 100 can return a quick response for the application and flush only the data in the cache that is relevant to the application (or temperature) that is requesting the flush. Because irrelevant data is not flushed, this embodiment can also provide better performance due to potential full jumbo page programing (i.e., it gives a better chance for more data to arrive and be programmed naturally to the jumbo block), while decreasing the write-amplification factor (WAF). Prioritizing commands in the command queue also reduces flush latency.

Figure 5:
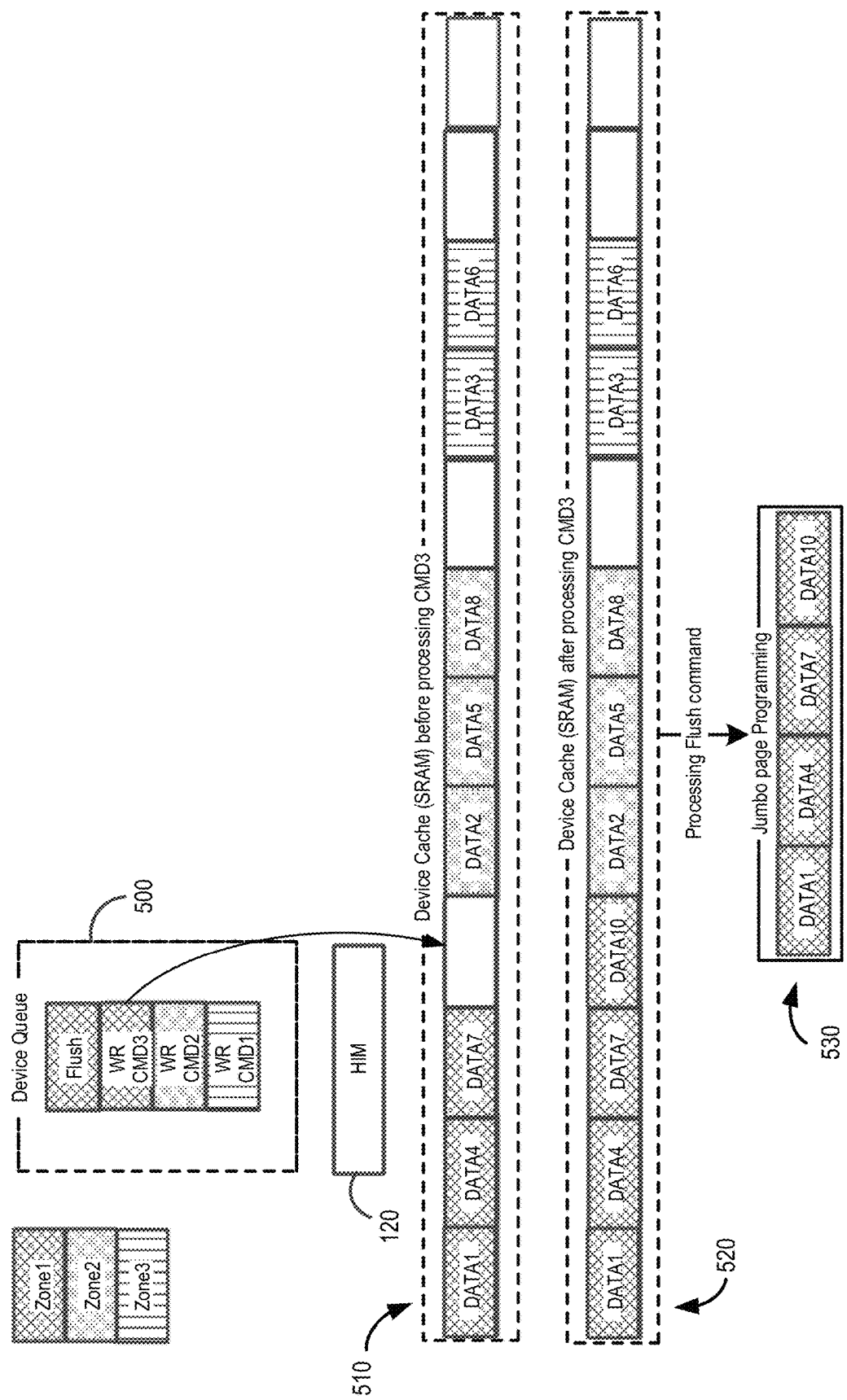
FIG. 5 is a block diagram illustrating a flush operation of an embodiment.
Figure 6:
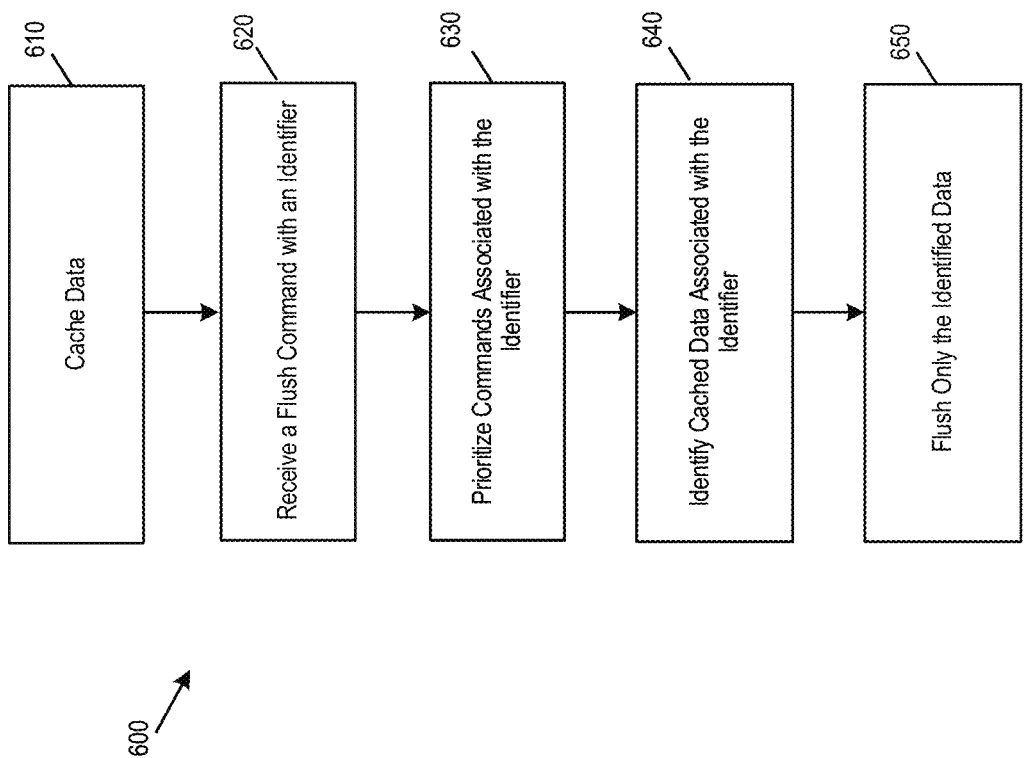
FIG. 6 is a flow chart of a method of an embodiment for flushing a cache.

This embodiment will now be discussed in conjunction with the block diagram in FIG. 5. As with the block diagram in the embodiment shown in FIG. 4, in this embodiment, the command queue 500 stores WR CMD 1, WR CMD 2, and WR CMD 3, which are associated with Zones 3, 2, and 1, respectively. The command queue 600 also stores a Flush command that is associated with Zone 1. That is, the Flush command contains an identifier of the zone (here, Zone 1) of the data that the host 300 wants to flush. In this embodiment, in response to the identifier in the flush command, the controller 102 prioritizes commands in the queue 500 that are associated with that identifier over the other commands. The result, which is shown in portions 510 and 520, is that the data (DATA11) from WR CMD 3 is stored in the cache, but the data (DATA9 and DATA10) from WR CMD 1 and WR CMD 2 are not because WR CMD 1 and WR CMD 2 are not associated with Zone 1. This reduces latency and expedites the flush by not executing the commands that are irrelevant to the flush. While only one command per identifier is stored in the command queue 500 in the example of FIG. 5, it should be understood that multiple commands per identifier can be stored and that the controller 102 can group together commands with the same identifiers as the host software that is waiting for the flush and process those commands together. This can reduce latency and improve data fragmentation.

When data is stored in the cache, the identifiers associated with the data are also stored. The controller 102 can store and use the identifiers in any suitable way. For example, when the controller 102 receives a write command with data and an identifier, the controller 102 can store the identifier in a table, in a linked list, and/or with the data in the cache in a way that would specify that the cached data is associated with the identifier. As another example, the controller 102 can store data associated with different identifiers in different physical locations (e.g., in a separate address ranges in volatile memory (e.g., SRAM), in different SLC blocks in the non-volatile memory 104, etc.).

Using the identifiers, the controller 102 can identify which of the cached data is associated with the identifier in the Flush command (Zone 1). In this example, the flush command specifies Zone 1, and the controller 102 identifies DATA1, DATA4, DATA7, and DATA10 as being associated with Zone 1. The controller 102 then copies only the identified data from the cache to the non-volatile memory 104. The controller 102 can then inform the host 300 that the flush was successful, so the host 300 and data storage device 100 can move on to their next tasks.

The flow chart 600 in FIG. 600 summarizes this method. After caching data (act 610), the data storage device 100 receives, from the host 300, a flush command with an identifier (act 620). The data storage device 100 prioritizes commands associated with the identifier (act 630) and identifies cached data that is associated with the identifier (act 640). The data storage device 100 flushes only the identified data (act 650). After the flush is complete, the data storage device 100 can return a completion message to the host 300.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional (2D) memory structure or a three-dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A data storage device comprising:
a non-volatile memory; and
a processor coupled with the non-volatile memory and configured to:
store, in a cache, data from a plurality of applications in a host to be written in the non-volatile memory, wherein each data is associated with a respective identifier;
receive, from the host, a flush command comprising a first identifier; and
in response to receiving the flush command comprising the first identifier:
select, from a command queue, only write command(s) that are associated with the first identifier;
store data associated with the selected write command(s) in the cache; and
flush, from the cache to the non-volatile memory, only data that is associated with the first identifier, wherein the data that is flushed to the non-volatile memory comprises data stored in the cache both before and after the flush command was received.

2. The data storage device of claim 1, wherein the first identifier comprises a context identifier, a stream identifier, a zone identifier, a group number identifier, and/or an application identifier.

3. The data storage device of claim 1, wherein the processor is further configured to store identifiers in a table, in a linked list, and/or with the data in the cache.

4. The data storage device of claim 1, wherein the processor is further configured to store data associated with different identifiers in different address ranges in a volatile memory.

5. The data storage device of claim 1, wherein the processor is further configured to store data associated with different identifiers in different single level cell (SLC) blocks in the non-volatile memory.

6. The data storage device of claim 1, wherein a cache size is larger than a page size of the non-volatile memory and flushing the cache comprises performing a plurality of write operations.

7. The data storage device of claim 1, wherein the cache is part of a volatile memory of the data storage device.

8. The data storage device of claim 1, wherein the processor is further configured to arrange the data in the cache according to temperature of the data, zone, stream, or identifier.

9. The data storage device of claim 1, wherein the non-volatile memory comprises a three-dimensional memory.

10. In a data storage device comprising non-volatile memory, a method comprising:
caching, in a cache, data received from a plurality of applications in a host, wherein each data is associated with a respective identifier that identifies the application from which the data originated;
receiving, from the host, a synch cache command comprising an identifier of one of the plurality of applications, wherein the host sends the synch cache command to the data storage device to confirm that data from the one of the plurality of applications has been stored in the non-volatile memory; and
in response to receiving the synch cache command:
using the identifier to identifying which of the data stored in the cache is associated with the one of the plurality of applications;
copying only the data associated with the one of the plurality of applications from the cache to the non-volatile memory, wherein the data that is copied to the non-volatile memory comprises any data associated with the one of the plurality of applications that was stored in the cache both before and after the synch cache command was received; and
informing the host that the data associated with the one of the plurality of applications has been stored in the non-volatile memory, wherein copying only the data associated with the one of the plurality of applications from the cache to the non-volatile memory reduces latency in informing the host that the data associated with the one of the plurality of applications has been stored in the non-volatile memory.

11. The method of claim 10, further comprising:
prioritizing a command in a command queue of the data storage device that is associated with the identifier.

12. The method of claim 10, wherein the identifier comprises a context identifier, a stream identifier, a zone identifier, a group number identifier, and/or an application identifier.

13. The method of claim 10, wherein data cached in the cache is associated with different identifiers, and wherein the different identifiers are stored in a table, in a linked list, and/or with the data in a cache.

14. The method of claim 10, wherein data cached in the cache is associated with different identifiers, and wherein the different identifiers are stored in different address ranges in a volatile memory.

15. The method of claim 10, wherein data cached in the cache is associated with different identifiers, and wherein the different identifiers are stored in different single level cell (SLC) blocks in the non-volatile memory.

16. The method of claim 10, wherein a cache size is larger than a page size of the non-volatile memory and copying comprises performing a plurality of write operations.

17. The method of claim 10, wherein the cache is in a volatile memory of the data storage device and/or in the non-volatile memory.

18. The method of claim 10, further comprising arranging the data in the cache according to temperature of the data, zone, stream, or identifier.

19. A data storage device comprising:
a cache;
a non-volatile memory; and
means for:
storing, in the cache, data from a plurality of applications in a host to be written in the non-volatile memory, wherein each data is associated with a respective identifier;
receiving, from the host, a flush command comprising a first identifier; and
in response to receiving the flush command comprising the first identifier:
selecting, from a command queue, only write command(s) that are associated with the first identifier;

storing data associated with the selected write command(s) in the cache; and flushing, from the cache to the non-volatile memory, only data that is associated with the first identifier, wherein the data that is flushed to the non-volatile memory comprises data stored in the cache both before and after the flush command was received.

20. The data storage device of claim 1, wherein the cache is part of the non-volatile memory of the data storage device.

* * * * *